United States Patent
Baghdasaryan

(10) Patent No.: US 10,148,630 B2
(45) Date of Patent: Dec. 4, 2018

(54) SYSTEM AND METHOD FOR IMPLEMENTING A HOSTED AUTHENTICATION SERVICE

(71) Applicant: NOK NOK LABS, INC., Palo Alto, CA (US)

(72) Inventor: Davit Baghdasaryan, San Francisco, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 14/448,814

(22) Filed: Jul. 31, 2014

(65) Prior Publication Data

US 2016/0248742 A1    Aug. 25, 2016

(51) Int. Cl.
*H04L 29/06* (2006.01)
*G06Q 20/40* (2012.01)
(Continued)

(52) U.S. Cl.
CPC .......... *H04L 63/08* (2013.01); *H04L 63/0884* (2013.01); *G06Q 20/40* (2013.01);
(Continued)

(58) Field of Classification Search
CPC ..... H04L 63/08; H04L 63/0823; H04L 63/10; H04L 63/12; H04L 63/0884; G06Q 20/40; G06Q 10/00; G06Q 20/382; H04W 4/80
See application file for complete search history.

(56) References Cited

U.S. PATENT DOCUMENTS

| 5,280,527 A | 1/1994 | Gullman et al. |
| 5,764,789 A | 6/1998 | Pare, Jr. et al. |

(Continued)

FOREIGN PATENT DOCUMENTS

| CN | 1705925 A | 12/2005 |
| CN | 101394283 A | 3/2009 |

(Continued)

OTHER PUBLICATIONS

Transmittal of International Preliminary Report on Patentability from foreign counterpart PCT/US2013/077888, dated Jul. 9, 2015, 7 pages.

(Continued)

*Primary Examiner* — Ayoub Alata
(74) *Attorney, Agent, or Firm* — Nicholson De Vos; Webster & Elliott LLP

(57) ABSTRACT

A system, apparatus, method, and machine readable medium are described for a hosted authentication service. For example, one embodiment of a system comprises: a hosted authentication service to provide authentication services for relying parties, the hosted authentication service registering a relying party by sharing a key with the relying party; a first program code component inserted into an application hosted by the relying party, the first program code component causing a client device accessing the application to be redirected to the hosted authentication service for authentication-related functions; and the hosted authentication service transmitting one or more assertions to the relying party specifying authentication-related events occurring between the client device and the hosted authentication service, the relying party validating the assertions using the key.

20 Claims, 9 Drawing Sheets

(51) Int. Cl.
H04W 4/80 (2018.01)
H04W 4/00 (2018.01)
(52) U.S. Cl.
CPC .......... H04L 63/0823 (2013.01); H04L 63/10 (2013.01); H04L 63/12 (2013.01); H04W 4/008 (2013.01); H04W 4/80 (2018.02)

(56) References Cited

U.S. PATENT DOCUMENTS

| | | |
|---|---|---|
| 6,088,450 A | 7/2000 | Davis et al. |
| 6,178,511 B1 | 1/2001 | Cohen et al. |
| 6,377,691 B1 | 4/2002 | Swift et al. |
| 6,618,806 B1 | 9/2003 | Brown et al. |
| 6,751,733 B1 | 6/2004 | Nakamura et al. |
| 6,842,896 B1 | 1/2005 | Redding et al. |
| 6,938,156 B2 | 8/2005 | Wheeler et al. |
| 7,155,035 B2 | 12/2006 | Kondo et al. |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,698,565 B1 | 4/2010 | Bjorn et al. |
| 7,865,937 B1 | 1/2011 | White |
| 7,941,669 B2 | 5/2011 | Foley et al. |
| 8,060,922 B2 | 11/2011 | Crichton et al. |
| 8,166,531 B2 | 4/2012 | Suzuki |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |
| 8,359,045 B1 | 1/2013 | Hopkins, III |
| 8,458,465 B1 | 6/2013 | Stern et al. |
| 8,489,506 B2 | 7/2013 | Hammad et al. |
| 8,516,552 B2 | 8/2013 | Raleigh |
| 8,555,340 B2 | 10/2013 | Potter et al. |
| 8,561,152 B2 | 10/2013 | Novak et al. |
| 8,584,219 B1 | 11/2013 | Toole et al. |
| 8,584,224 B1 | 11/2013 | Pei et al. |
| 8,607,048 B2 | 12/2013 | Nogawa |
| 8,646,060 B1 | 2/2014 | Ben Ayed |
| 8,713,325 B2 | 4/2014 | Ganesan |
| 8,719,905 B2 | 5/2014 | Ganesan |
| 8,776,180 B2 | 7/2014 | Kumar et al. |
| 8,856,541 B1 | 10/2014 | Chaudhury et al. |
| 8,949,978 B1 | 2/2015 | Lin |
| 8,958,599 B1 | 2/2015 | Starner |
| 8,978,117 B2 | 3/2015 | Bentley et al. |
| 9,015,482 B2 | 4/2015 | Baghdasaryan et al. |
| 9,032,485 B2 | 5/2015 | Chu et al. |
| 9,083,689 B2 | 7/2015 | Lindemann et al. |
| 9,161,209 B1 | 10/2015 | Ghoshal et al. |
| 9,171,306 B1 | 10/2015 | He et al. |
| 9,172,687 B2 | 10/2015 | Baghdasaryan et al. |
| 9,367,678 B2 | 6/2016 | Pal et al. |
| 9,396,320 B2 | 7/2016 | Lindemann |
| 2001/0037451 A1 | 11/2001 | Bhagavatula et al. |
| 2002/0010857 A1 | 1/2002 | Karthik |
| 2002/0016913 A1 | 2/2002 | Wheeler et al. |
| 2002/0040344 A1 | 4/2002 | Preiser et al. |
| 2002/0073316 A1 | 6/2002 | Collins et al. |
| 2002/0073320 A1 | 6/2002 | Rinkevich et al. |
| 2002/0087894 A1 | 7/2002 | Foley et al. |
| 2002/0112170 A1 | 8/2002 | Foley et al. |
| 2002/0174344 A1 | 11/2002 | Ting |
| 2002/0174348 A1 | 11/2002 | Ting |
| 2002/0190124 A1 | 12/2002 | Piotrowski |
| 2003/0021283 A1 | 1/2003 | See et al. |
| 2003/0055792 A1 | 3/2003 | Kinoshita et al. |
| 2003/0065805 A1 | 4/2003 | Barnes et al. |
| 2003/0084300 A1 | 5/2003 | Koike |
| 2003/0087629 A1 | 5/2003 | Juitt |
| 2003/0115142 A1 | 6/2003 | Brickell et al. |
| 2003/0135740 A1 | 7/2003 | Talmor et al. |
| 2003/0152252 A1 | 8/2003 | Kondo |
| 2003/0226036 A1 | 12/2003 | Bivens et al. |
| 2003/0236991 A1 | 12/2003 | Letsinger |
| 2004/0101170 A1 | 5/2004 | Tisse et al. |
| 2004/0123153 A1 | 6/2004 | Wright et al. |
| 2005/0021964 A1 | 1/2005 | Bhatnagar et al. |
| 2005/0080716 A1 | 4/2005 | Belyi et al. |
| 2005/0097320 A1 | 5/2005 | Golan et al. |
| 2005/0125295 A1 | 6/2005 | Tidwell et al. |
| 2005/0160052 A1 | 7/2005 | Schneider et al. |
| 2005/0187883 A1 | 8/2005 | Bishop et al. |
| 2005/0223217 A1 | 10/2005 | Howard et al. |
| 2005/0223236 A1 | 10/2005 | Yamada et al. |
| 2005/0278253 A1 | 12/2005 | Meek et al. |
| 2006/0026671 A1 | 2/2006 | Potter et al. |
| 2006/0029062 A1 | 2/2006 | Rao |
| 2006/0156385 A1 | 7/2006 | Chiviendacz et al. |
| 2006/0161435 A1 | 7/2006 | Atef et al. |
| 2006/0161672 A1* | 7/2006 | Jolley .................... G06F 9/542 709/230 |
| 2006/0282670 A1 | 12/2006 | Karchov |
| 2007/0005988 A1 | 1/2007 | Zhang et al. |
| 2007/0077915 A1 | 4/2007 | Black et al. |
| 2007/0088950 A1 | 4/2007 | Wheeler |
| 2007/0100756 A1 | 5/2007 | Varma |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2008/0005562 A1 | 1/2008 | Sather et al. |
| 2008/0025234 A1 | 1/2008 | Zhu |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi |
| 2008/0086759 A1 | 4/2008 | Colson |
| 2008/0134311 A1 | 6/2008 | Medvinsky |
| 2008/0141339 A1 | 6/2008 | Gomez et al. |
| 2008/0172725 A1 | 7/2008 | Fujii et al. |
| 2008/0184351 A1 | 7/2008 | Gephart et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0049510 A1 | 2/2009 | Zhang et al. |
| 2009/0064292 A1 | 3/2009 | Carter et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan |
| 2009/0183003 A1 | 7/2009 | Haverinen |
| 2009/0187988 A1 | 7/2009 | Hulten et al. |
| 2009/0193508 A1 | 7/2009 | Brenneman |
| 2009/0196418 A1 | 8/2009 | Tkacik et al. |
| 2009/0199264 A1 | 8/2009 | Lang |
| 2009/0204964 A1 | 8/2009 | Foley |
| 2009/0235339 A1 | 9/2009 | Mennes et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |

(56) References Cited

U.S. PATENT DOCUMENTS

| | | |
|---|---|---|
| 2009/0328197 A1 | 12/2009 | Newell |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0192209 A1 | 7/2010 | Steeves et al. |
| 2010/0205658 A1 | 8/2010 | Griffin |
| 2010/0223663 A1 | 9/2010 | Morimoto et al. |
| 2010/0242088 A1 | 9/2010 | Thomas |
| 2010/0287369 A1 | 11/2010 | Monden |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan |
| 2011/0083016 A1 | 4/2011 | Kesanupalli et al. |
| 2011/0093942 A1 | 4/2011 | Koster et al. |
| 2011/0099361 A1 | 4/2011 | Shah et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0047555 A1 | 2/2012 | Xiao et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0067546 A1 | 3/2013 | Thavasi et al. |
| 2013/0073859 A1* | 3/2013 | Carlson ............... H04L 9/3247 713/176 |
| 2013/0086669 A1 | 4/2013 | Sondhi et al. |
| 2013/0090939 A1 | 4/2013 | Robinson |
| 2013/0097682 A1 | 4/2013 | Zeljkovic |
| 2013/0104187 A1 | 4/2013 | Weidner |
| 2013/0104190 A1 | 4/2013 | Simske |
| 2013/0119130 A1 | 5/2013 | Braams |
| 2013/0124285 A1* | 5/2013 | Pravetz ............... G06Q 10/00 705/14.23 |
| 2013/0124422 A1 | 5/2013 | Hubert et al. |
| 2013/0125197 A1 | 5/2013 | Pravetz |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |
| 2014/0002238 A1 | 1/2014 | Taveau et al. |
| 2014/0007215 A1 | 1/2014 | Romano |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |

(56) References Cited

U.S. PATENT DOCUMENTS

| | | |
|---|---|---|
| 2014/0282945 A1 | 9/2014 | Smith et al. |
| 2014/0282965 A1 | 9/2014 | Sambamurthy et al. |
| 2014/0289117 A1 | 9/2014 | Baghdasaryan |
| 2014/0289820 A1 | 9/2014 | Lindemann et al. |
| 2014/0289833 A1 | 9/2014 | Briceno et al. |
| 2014/0289834 A1 | 9/2014 | Lindemann |
| 2014/0298419 A1 | 10/2014 | Boubez |
| 2014/0304505 A1 | 10/2014 | Dawson |
| 2014/0335824 A1 | 11/2014 | Abraham |
| 2014/0337948 A1 | 11/2014 | Hoyos |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0121068 A1 | 4/2015 | Lindemann et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0244696 A1 | 8/2015 | Ma |
| 2015/0269050 A1 | 9/2015 | Filimonov |
| 2015/0326529 A1 | 11/2015 | Morita |
| 2015/0373039 A1 | 12/2015 | Wang |
| 2015/0381580 A1 | 12/2015 | Graham et al. |
| 2016/0036588 A1 | 2/2016 | Thackston |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0188958 A1 | 6/2016 | Martin |
| 2017/0004487 A1 | 1/2017 | Hagen et al. |
| 2017/0048070 A1 | 2/2017 | Gulati et al. |
| 2017/0109751 A1 | 4/2017 | Dunkelberger et al. |
| 2017/0221068 A1 | 8/2017 | Krauss et al. |

FOREIGN PATENT DOCUMENTS

| | | |
|---|---|---|
| CN | 102763111 A | 10/2012 |
| EP | 2357754 A1 | 8/2011 |
| JP | 2004348308 A | 12/2004 |
| JP | 2007220075 A | 8/2007 |
| JP | 2008065844 A | 3/2008 |
| JP | 2013016070 A | 1/2013 |
| WO | 03017159 A1 | 2/2003 |
| WO | 2005003985 A1 | 1/2005 |
| WO | 2009158530 A2 | 12/2009 |
| WO | 2013082190 A1 | 6/2013 |
| WO | 2014105994 A2 | 7/2014 |
| WO | 2015130734 A1 | 9/2015 |

OTHER PUBLICATIONS

Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42827, dated Oct. 30, 2015, 9 pages.
Validity, OSTP Framework, 24 pages, 2010.
Notice of Allowance from U.S. Appl. No. 14/268,686, dated Nov. 5, 2015, 23 pages.
Notification of Transmittal of the International Search Report and the Written Opinion from counterpart Patent Cooperation Treaty Application No. PCT/US15/50348, dated Dec. 22, 2015, 9 pages.
Office Action from U.S. Appl. No. 14/448,868, dated Dec. 3, 2015, 15 pages.
Office Action from U.S. Appl. No. 14/487,992, dated Dec. 31, 2015, 12 pages.
Final Office Action from U.S. Appl. No. 14/268,619, dated Dec. 14, 2015, 10 pages.
Notification of Transmittal of International Search Report and Written Opinion from PCT/US2015/028927, dated Jul. 30, 2015, 12 pages.
Transmittal of International Preliminary Report on Patentability from foreign counterpart PCT Patent Application No. PCT/US2014/039627 dated Dec. 10, 2015, 8 pages.
Notice of Allowance from U.S. Appl. No. 14/448,697, dated Jan. 14, 2016, 23 pages.
Final Office Action from U.S. Appl. No. 14/268,733, dated Jan. 15, 2016, 14 pages.
Notice of Allowance from U.S. Appl. No. 14/145,533, dated Jan. 20, 2016, 12 pages.
Office Action from U.S. Appl. No. 14/218,743, dated Jan. 21, 2016, 12 pages.
Office Action from U.S. Appl. No. 14/218,551, dated Jan. 21, 2016, 11 pages.
Office Action from U.S. Appl. No. 14/218,575, dated Jan. 29, 2016, 25 pages.
Transmittal of International Preliminary Report on Patentability from foreign counterpart PCT Patent Application No. PCT/US2014/031344 dated Oct. 1, 2015, 9 pages.
Notice of Allowance from U.S. Appl. No. 14/145,607, dated Feb. 1, 2016, 28 pages.
Final Office Action from U.S. Appl. No. 14/066,273, dated Feb. 11, 2016, 29 pages.
Final Office Action from U.S. Appl. No. 14/218,692, dated Mar. 2, 2016, 24 pages.
Final Office Action from U.S. Appl. No. 14/218,646, dated Mar. 10, 2016, 23 pages.
Notice of Allowance from U.S. Appl. No. 14/145,439, dated Mar. 14, 2016, 17 pages.
Notice of Allowance from U.S. Appl. No. 14/066,384, dated Mar. 17, 2016, 40 pages.
Office Action from U.S. Appl. No. 14/268,619, dated Mar. 21, 2016, 7 pages.
Notice of Allowance from U.S. Appl. No. 14/268,686, dated Mar. 30, 2016, 38 pages.
Office Action from U.S. Appl. No. 14/218,551, dated May 12, 2016, 11 pages.
Office Action from U.S. Appl. No. 14/448,868, dated May 12, 2016, 11 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,384 dated Jan. 7, 2015, 24 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,551 dated Apr. 23, 2015, 9 pages.
Non-Final Office Action from U.S. Appl. No. 14/218,575 dated Feb. 10, 2015, 17 pages.
Non-Final Office Action from U.S. Appl. No. 14/218,611 dated Jun. 16, 2016, 13 pages.

(56) References Cited

OTHER PUBLICATIONS

Non-Final Office Action from U.S. Appl. No. 14/218,677 dated Aug. 2, 2016, 15 pages.
Non-Final Office Action from U.S. Appl. No. 14/218,692 dated Nov. 4, 2015, 16 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/268,619 dated Aug. 24, 2015, 17 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/145,439 dated Jul. 6, 2015, 6 pages.
Notice of Allowance from U.S. Appl. No. 14/145,439 dated Oct. 28, 2015, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Sep. 2, 2015, 19 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,733 dated Sep. 23, 2016, 8 pages.
Notice of Allowance from U.S. Appl. No. 14/448,641 dated Jun. 7, 2016, 13 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/487,992 dated Sep. 6, 2016, 26 pages.
Notification of Transmittal of the International Search Report and the Written Opinion from counterpart Patent Cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal of the International Search Report and the Written Opinion from counterpart Patent Cooperation Treaty Application No. PCT/US2015/042786, dated Oct. 16, 2015, 8 pages.
Notification of Transmittal of the International Search Report and the Written Opinion from counterpart Patent Cooperation Treaty Application No. PCT/US2015/042799, dated Oct. 16, 2015, 8 pages.
Notification of Transmittal of the International Search Report and the Written Opinion from counterpart Patent Cooperation Treaty Application No. PCT/US2015/42783, dated Oct. 19, 2015, 13 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL_CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 dated Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.

(56) References Cited

OTHER PUBLICATIONS

Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.

Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverviewEUSIPC004.pdf.

Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.

Schuckers, "Spoofing and Anti-Spoofing Measures," Information Security Technical Report, 2002, vol. 2002, pp. 56-62.

Schwartz., et al., "Face Spoofing Detection Through Partial Least Squares and Low-Level Descriptors," International Conference on Biometrics, 2011, vol. 2011, pp. 1-8.

Smiatacz M., et al., Gdansk University of Technology. Liveness Measurements Using Optical Flow for Biometric Person Authentication. Metrology and Measurement Systems. 2012, vol. XIX, 2. pp. 257-268.

Supplementary Partial European Search Report for Application No. 13867269, dated Aug. 3, 2016, 7 pages.

T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.

Tan., et al., "Face Liveness Detection from a Single Image with Sparse Low Rank Bilinear Discriminative Model," European Conference on Computer Vision, 2010, vol. 2010, pp. 1-14.

The Extended M2VTS Database, [retrieved on Sep. 29, 2012], Retrieved from the Internet: URL: http://www.ee.surrey.ac.uk/CVSSP/xm2vtsdb/, 1 page.

The Online Certificate Status Protocol, OCSP, RFC2560, 22 pages.

The source for Linux information, Linux.com, [online], [retrieved on Jan. 28, 2015], 2012, 3 pages.

Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.

Tronci R., et al., "Fusion of Multiple Clues for Photo-Attack Detection in Face Recognition Systems," Inti. Joint Conference on Biometrics, 2011. pp. 1-6.

Uludag, Umut, and Anil K. Jain. "Attacks on biometric systems: a case study in fingerprints." Electronic Imaging 2004. International Society for Optics and Photonics, 2004, 12 pages.

Unobtrusive User-Authentication on Mobile Phones using Biometric Gait Recognition, 2010, 6 pages.

Vassilev, A.T.; du Castel, B.; Ali, A.M., "Personal Brokerage of Web Service Access," Security & Privacy, IEEE, vol. 5, No. 5, pp. 24-31, Sep.-Oct. 2007.

WikiPedia article for Eye Tracking, 15 pages, Last Modified Jun. 21, 2014, en.wikipedia.org/wiki/Eye_tracking.

Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.

Wilson, R., James. Unbuntu Life, "How to Trick Google's New Face Unlock on Android 4.1 Jelly Bean". Print Screen Mac. [Online] Aug. 6, 2012. [Cited: Sep. 28, 2012], 5 pages. http://printscreenmac.info/how-to-trick-android-jelly-bean-faceunlock/. downloaded Aug. 13, 2015.

World Wide Web Consortium, W3C Working Draft: Media Capture and Streams, 2013, 36 pages.

Zhang, "Security Verification of Hardware-enabled Attestation Protocols," IEEE, 2012, pp. 47-54.

Zhao W., et al., "Face Recognition: A Literature Survey," ACM Computing Surveys, 2003, vol. 35 (4), pp. 399-458.

Zhou, et al., "Face Recognition from Still Images and Videos". University of Maryland, College Park, MD 20742 Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.

Abate A., et al.,"2D and 3D face recognition: A survey", 2007, pp. 1885-1906.

Advisory Action from U.S. Appl. No. 13/730,791 dated Jan. 23, 2015, 4 pages.

Akhtar Z., et al.,"Spoof Attacks on Multimodal Biometric Systems", International Conference on Information and Network Technology, 2011, vol. 4, pp. 46-51.

Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.

Barker E., et al.,"Recommendation for key management Part 3: Application -Specific Key Management Guidance", NIST Special Publication 800-57, 2009, pp. 1-103.

BehavioSec, "Measuring FAR/FRR/EER in Continuous Authentication," Stockholm, Sweden (2009), 8 pages.

Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.

Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359- 0/11.

Chen L., et al., "Flexible and scalable digital signatures in TPM 2.0." Proceedings of the 2013 ACM SIGSAC conference on Computer & communications security. ACM, 2013, 12 pages.

Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.

Continuous User Authentication Using Temporal Information, http://www.cse.msu.edu/biometrics/Publications/Face/NiinumaJain_ContinuousAuth_SPIE10.pdf, 11 pages.

Crazy Egg Heatmap Shows Where People Click on Your Website, 2012, 3 pages, www.michaelhartzell.com/Blog/bid/92970/Crazy-Egg-Heatmap-shows-where-people-click-on-your-website).

Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.

Delac K. et al., Eds., InTech, Jun. 1, 2008, Retrieved from the Internet:, ISBN 978-953-7619-34-3, Uploaded as individual Chapters 1-15, 15 pages.

Doherty, et al., Internet Engineering Task Force (IETF), "Dynamic Symmetric Key Provisioning Protocol (DSKPP)", Dec. 2010, 105 pages.

Edited by Kresimir Delac, Mislav Grgic and Marian Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.

Final Office Action from U.S. Appl. No. 13/730,761 dated Jan. 15, 2015, 31 pages.

Final Office Action from U.S. Appl. No. 13/730,761 dated Jul. 8, 2014, 36 pages.

Final Office Action from U.S. Appl. No. 13/730,776 dated Nov. 3, 2014, 20 pages.

Final Office Action from U.S. Appl. No. 13/730,780 dated Jan. 27, 2015, 30 pages.

Final Office Action from U.S. Appl. No. 13/730,780 dated May 12, 2014, 34 pages.

Final Office Action from U.S. Appl. No. 13/730,791 dated Nov. 13, 2014, 22 pages.

Final Office Action from U.S. Appl. No. 13/730,795 dated Aug. 14, 2014, 20 pages.

(56) References Cited

OTHER PUBLICATIONS

Final Office Action from U.S. Appl. No. 14/066,384 dated Aug. 20, 2015, 23 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,646 dated Aug. 11, 2016, 25 pages.
Final Office Action from U.S. Appl. No. 14/448,868 dated Aug. 19, 2016, 11 pages.
Grother, P.J., et al., NIST. Report on the Evaluation of 2D Still-Image Face Recognition Algorithms, NIST IR 7709.s.l, NIST, 2011, Jun. 22, 2010, pp. 1-58.
GSM Arena. [Online] Nov. 13, 2011, [Cited: Sep. 29, 2012.], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila, M., et al., "A Texture-Based Method for Modeling the Background and Detecting Moving Objects". Oulu : IEEE [online]. Jun. 22 2005. Draft. 16 pages Retrieved from the Internet: URL:http://www.ee.oulu.fi/mvg/files/pdf/pdf_662.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Search Report and Written Opinion for Application No. PCT/US2015/028924 dated Jul. 30, 2015, 10 pages.
Jafri R., et al. "A Survey of Face Recognition Techniques," Journal of Information Processing Systems, 2009, vol. 5 (2), pp. 41-68.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5? pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing-ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 dated Feb. 27, 2014, 24 pages.
Communication pursuant to Rules 161(2) and 162 EPC for EP Application No. 15826364.0, dated Mar. 7, 2017, 2 pages.
Extended European Search Report for Application No. 13867269, dated Nov. 4, 2016, 10 pages.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 14/066,273, dated Jan. 10, 2017, 24 pages.
Final Office Action from U.S. Appl. No. 14/145,466, dated Apr. 13, 2017, 61 pages.
Final Office Action from U.S. Appl. No. 14/218,611, dated Jan. 27, 2017, 14 pages.
Final Office Action from U.S. Appl. No. 14/218,692, dated Feb. 28, 2017, 27 pages.
Final Office Action from U.S. Appl. No. 14/218,743, dated Mar. 3, 2017, 67 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Notice of Allowance from U.S. Appl. No. 14/066,384, dated May 23, 2017, 50 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,733, dated Jan. 20, 2017, 62 pages.
Notice of Allowance from U.S. Appl. No. 14/448,868, dated Apr. 27, 2017, 62 pages.
Notice of Allowance from U.S. Appl. No. 14/448,868, dated Mar. 23, 2017, 57 pages.

(56) References Cited

OTHER PUBLICATIONS

Notice of Allowance from U.S. Appl. No. 14/487,992, dated Apr. 12, 2017, 14 pages.
Notice of Allowance from U.S. Appl. No. 14/487,992, dated Dec. 27, 2016, 28 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Communication pursuant to Rules 70(2) and 70a(2) EPC for European Application No. 15786487.7, dated Nov. 9, 2017, 1 page.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/218,743, dated Feb. 7, 2018, 27 pages.
Final Office Action from U.S. Appl. No. 14/268,563, dated Nov. 3, 2017, 46 pages.
Final Office Action from U.S. Appl. No. 15/595,460, dated Jan. 11, 2018, 19 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Martins R A., et al., "A Potpourri of Authentication Mechanisms the Mobile Device Way," CISTI, Jan. 2013, pp. 843-848.
Non-Final Office Action from U.S. Appl. No. 14/218,611, dated Sep. 19, 2017, 76 pages.
Non-Final Office Action from U.S. Appl. No. 14/218,677, dated Feb. 2, 2018, 25 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 09 pages.
Notice of Allowance from U.S. Appl. No. 14/066,273, dated Jan. 18, 2018, 26 pages.
Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/448,868, dated Nov. 17, 2017, 15 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Notice of Allowance from U.S. Appl. No. 14/859,328, dated Feb. 1, 2018, 18 pages.
Office Action and Search Report from foreign counterpart Chinese Patent Application No. 201480031042.X, dated Dec. 4, 2017, 20 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Corrected Notice of Allowance from U.S. Appl. No. 14/066,273, dated Feb. 8, 2018, 4 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Final Office Action from U.S. Appl. No. 15/396,452, dated Feb. 27, 2018, 24 pages.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
Non-Final Office Action from U.S. Appl. No. 14/218,575, dated Mar. 8, 2018, 29 pages.
Non-Final Office Action from U.S. Appl. No. 14/218,646, dated Mar. 7, 2018, 32 pages.
Non-Final Office Action from U.S. Appl. No. 15/229,254, dated Feb. 14, 2018, 75 pages.
Notification of Reason for Rejection from foreign counterpart Japanese Patent Application No. 2016-505506, dated Feb. 13, 2018, 6 pages.
Office Action from foreign counterpart Japanese Patent Application No. 2015-550778, dated Feb. 7, 2018, 14 pages.
Final Office Action from U.S. Appl. No. 14/218,677, dated May 31, 2018, 16 pages.
Final Office Action from U.S. Appl. No. 14/218,611, dated May 3, 2018, 26 pages.
Final Office Action from U.S. Appl. No. 14/218,692, dated Apr. 17, 2018, 99 pages.

(56) References Cited

OTHER PUBLICATIONS

Non-Final Office Action from U.S. Appl. No. 14/145,466, dated May 11, 2018, 33 pages.
Non-Final Office Action from U.S. Appl. No. 15/881,522, dated Jun. 6, 2018, 87 pages.
Non-Final Office action from U.S. Appl. No. 15/595,460, dated May 3, 2018, 20 pages.
Notice of Allowance from U.S. Appl. No. 14/218,504, dated May 31, 2018, 95 pages.

* cited by examiner

SYSTEM AND METHOD FOR IMPLEMENTING A HOSTED AUTHENTICATION SERVICE

BACKGROUND

Field of the Invention

This invention relates generally to the field of data processing systems. More particularly, the invention relates to a system and method for implementing a hosted authentication service.

Description of Related Art

Systems have also been designed for providing secure user authentication over a network using biometric sensors. In such systems, the a score generated by an authenticator, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications, which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 Application"). These applications are sometimes referred to herein as the ("Co-pending Applications").

Briefly, the Co-Pending applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register/provision the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

The '504 Application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1A:
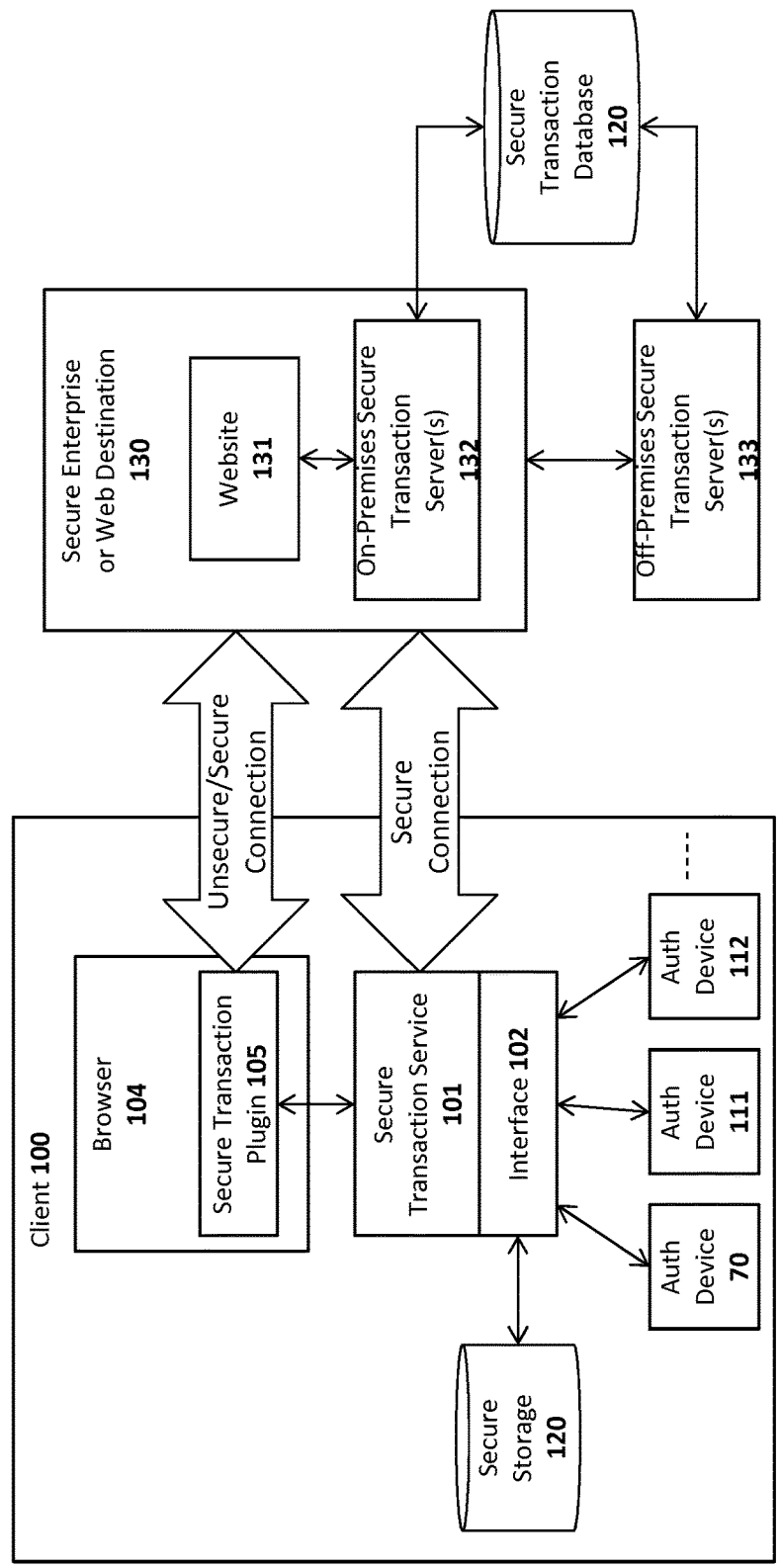
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers (sometimes referred to as "au implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures and Transactions

Figure 1B:
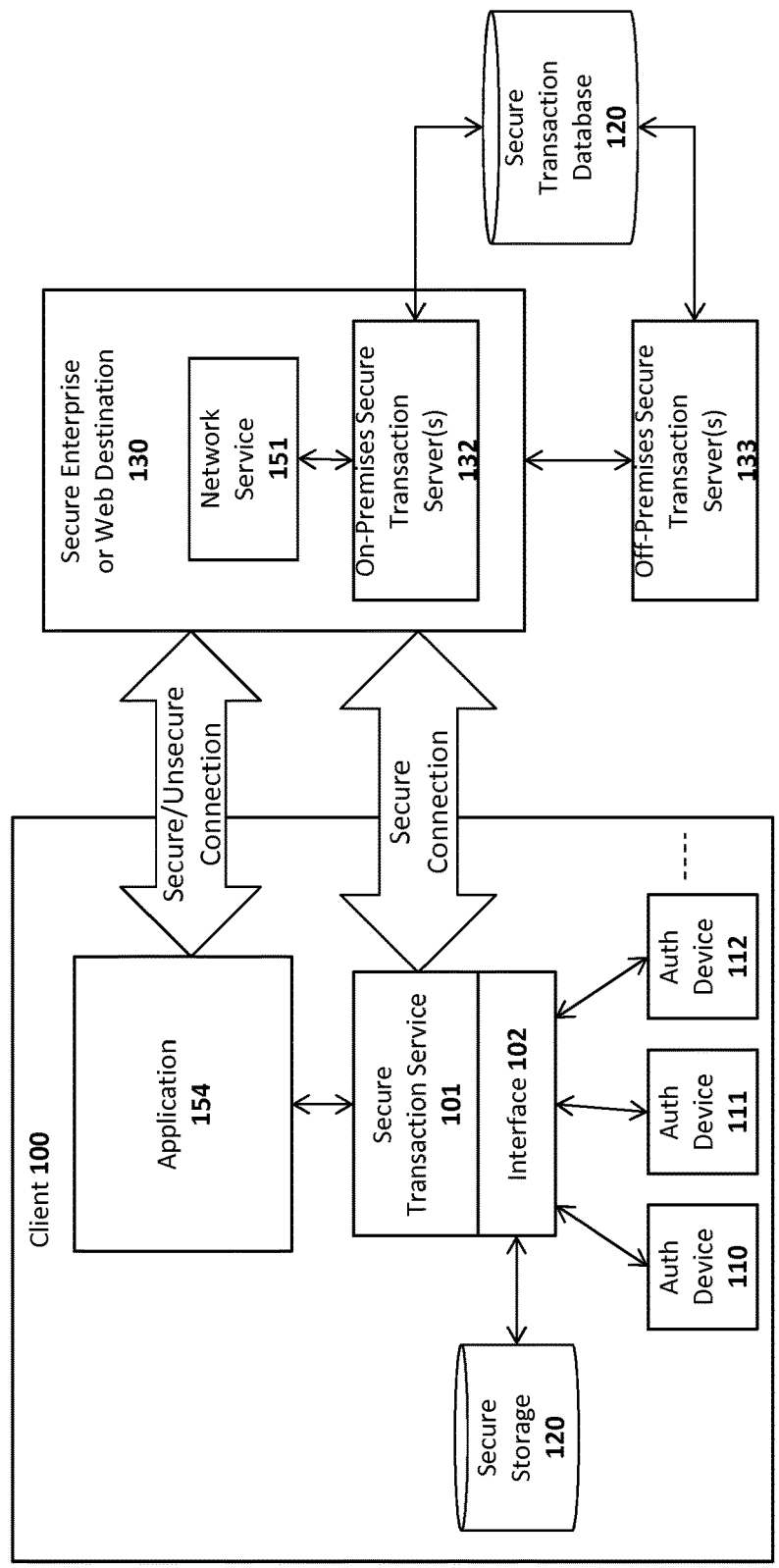

FIGS. 1A-B illustrate two embodiments of a system architecture comprising client-side and server-side components for registering authentication devices (also sometimes referred to as "provisioning") and authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by the authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Certain basic principles associated with remotely registering authentication devices and authenticating with a relying party will be described with respect to FIGS. 2-3, followed by a detailed description of embodiments of the invention for establishing trust using secure communication protocols.

Figure 2:
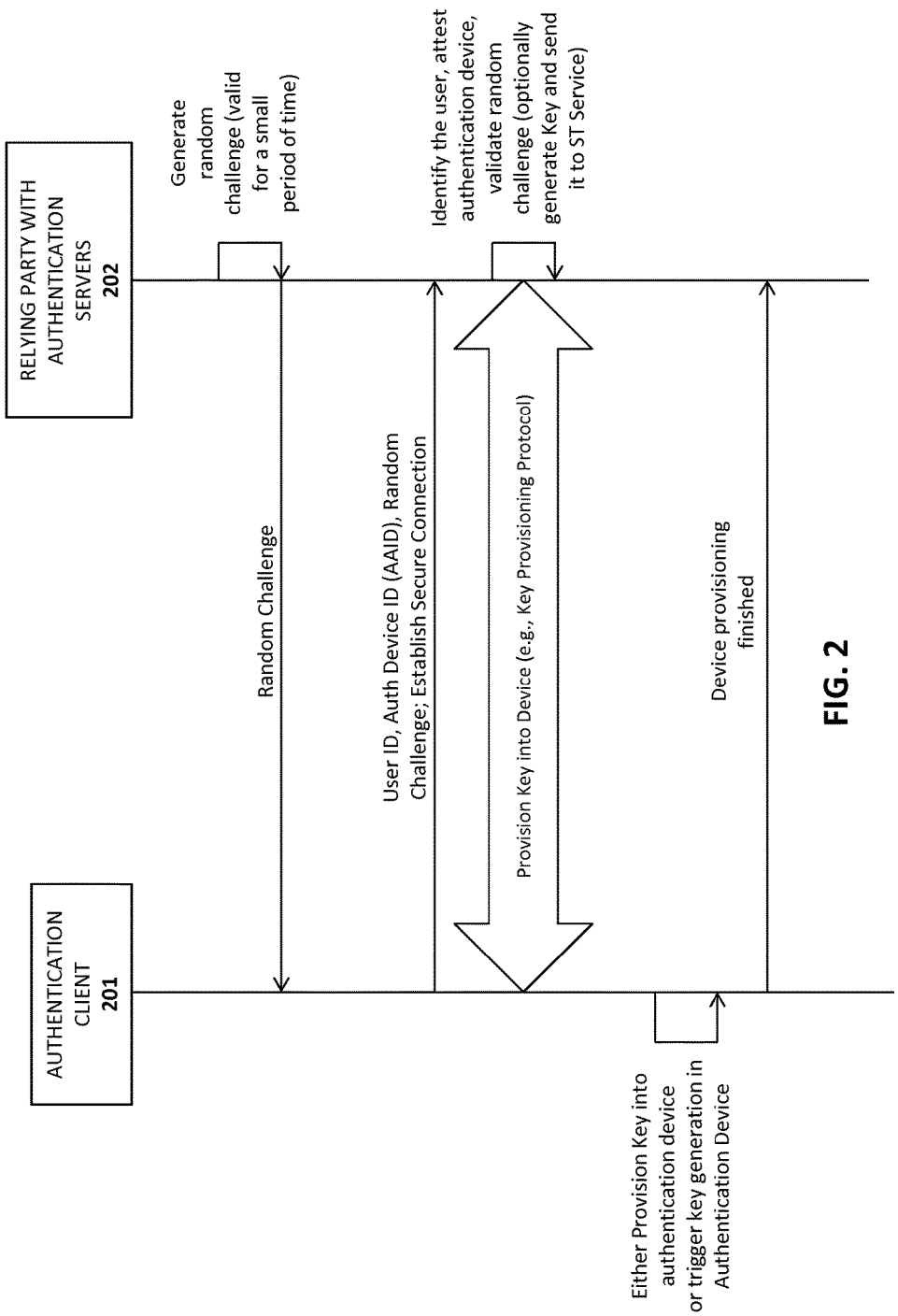
FIG. 2 is a transaction diagram showing how keys may be registered into authentication devices.

FIG. 2 illustrates a series of transactions for registering authentication devices on a client (such as devices 110-112 on client 100 in FIGS. 1A-B) (sometimes referred to as "provisioning" authentication devices). For simplicity, the secure transaction service 101 and interface 102 are combined together as authentication client 201 and the secure enterprise or web destination 130 including the secure transaction servers 132-133 are represented as a relying party 202.

During registration of an authenticator (e.g., a fingerprint authenticator, voice authenticator, etc), a key associated with the authenticator is shared between the authentication client 201 and the relying party 202. Referring back to FIGS. 1A-B, the key may be stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys are be used. In this embodiment, the public/private key pair may be generated by the secure transaction servers 132-133. The public key may then be stored by the secure transaction servers 132-133 and the related private key may be stored in the secure storage 120 on the client. In an alternate embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol is employed in one embodiment to share the key with the client over a secure communication channel. One example of a key provisioning protocol is the Dynamic Symmetric Key Provisioning Protocol (DSKPP) (see, e.g., Request for Comments (RFC) 6063). However, the underlying principles of the invention are not limited to any particular key provisioning protocol. In one particular embodiment, the client generates a public/private key pair and sends the public key to the server, which may be attested with an attestation key.

Turning to the specific details shown in FIG. 2, to initiate the registration process, the relying party 202 generates a randomly generated challenge (e.g., a cryptographic nonce) that must be presented by the authentication client 201 during device registration. The random challenge may be valid for a limited period of time. In response, the authentication client 201 initiates an out-of-band secure connection with the relying party 202 (e.g., an out-of-band transaction) and communicates with the relying party 202 using the key provisioning protocol (e.g., the DSKPP protocol mentioned above). To initiate the secure connection, the authentication client 201 may provide the random challenge back to the relying party 202 (potentially with a signature generated over the random challenge). In addition, the authentication client 201 may transmit the identity of the user (e.g., a user ID or other code) and the identity of the authentication device(s) to be provisioned registered (e.g., using the authentication attestation ID (AAID) which uniquely identify the type of authentication device(s) being provisioned).

The relying party locates the user with the user name or ID code (e.g., in a user account database), validates the random challenge (e.g., using the signature or simply comparing the random challenge to the one that was sent), validates the authentication device's authentication code if one was sent (e.g., the AAID), and creates a new entry in a secure transaction database (e.g., database 120 in FIGS. 1A-B) for the user and the authentication device(s). In one embodiment, the relying party maintains a database of authentication devices which it accepts for authentication. It may query this database with the AAID (or other authentication device(s) code) to determine if the authentication device(s) being provisioned are acceptable for authentication. If so, then it will proceed with the registration process.

In one embodiment, the relying party 202 generates an authentication key for each authentication device being provisioned. It writes the key to the secure database and sends the key back to the authentication client 201 using the key provisioning protocol. Once complete, the authentication device and the relying party 202 share the same key if a symmetric key was used or different keys if asymmetric keys were used. For example, if asymmetric keys were used, then the relying party 202 may store the public key and provide the private key to the authentication client 201. Upon receipt of the private key from the relying party 202, the authentication client 201 provisions the key into the authentication device (storing it within secure storage associated with the authentication device). It may then use the key during authentication of the user (as described below). In an alternate embodiment, the key(s) are generated by the authentication client 201 and the key provisioning protocol is used to provide the key(s) to the relying party 202. In either case, once provisioning is complete, the authentication client 201 and relying party 202 each have a key and the authentication client 201 notifies the relying party of the completion.

Figure 3:
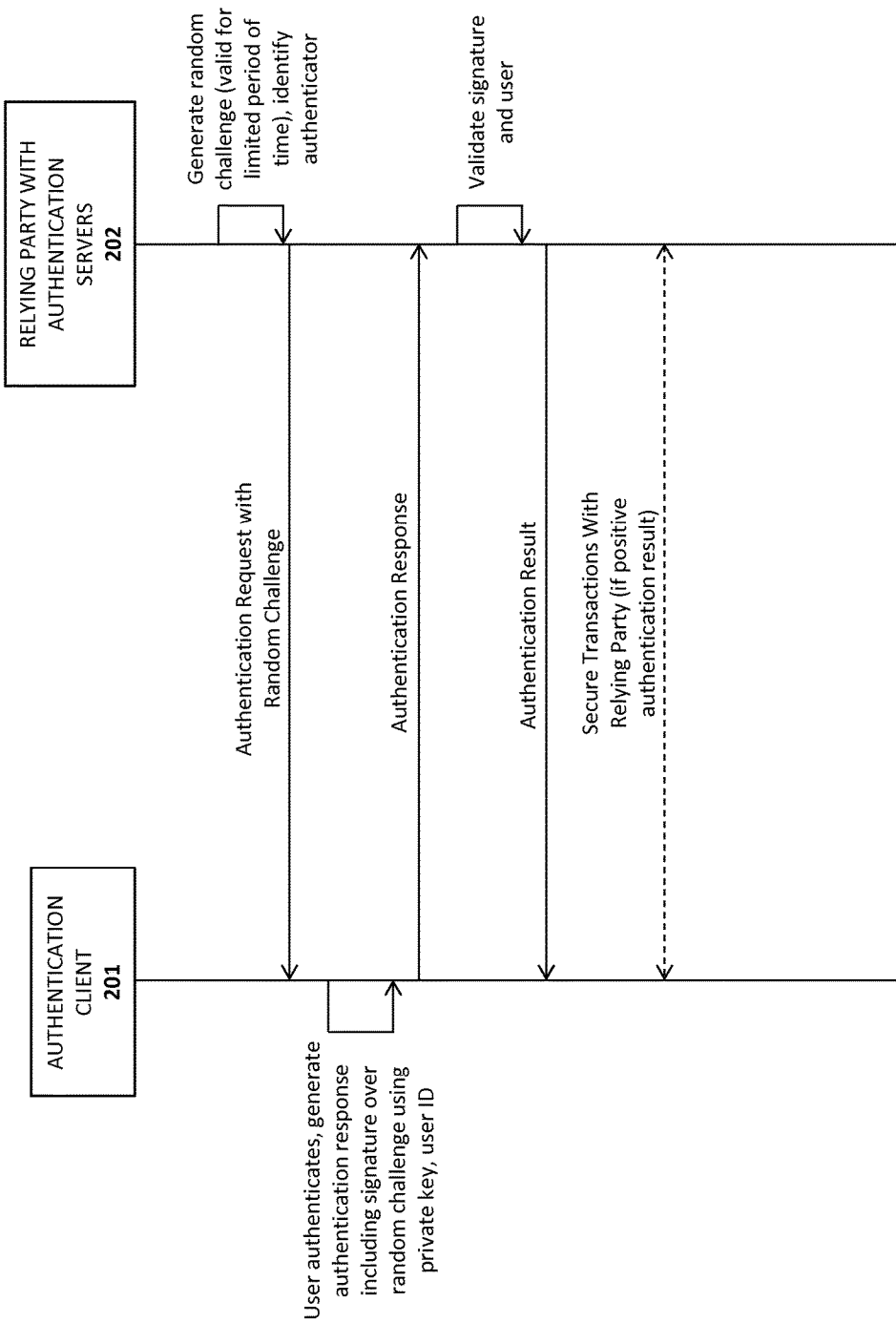
FIG. 3 illustrates a transaction diagram showing remote authentication.

FIG. 3 illustrates a series of transactions for user authentication with the provisioned authentication devices. Once device registration is complete (as described in FIG. 2), the relying party 202 will accept an authentication response (sometimes referred to as a "token") generated by the local authentication device on the client as a valid authentication response.

Turning to the specific details shown in FIG. 3, in response to the user initiating a transaction with the relying party 202 which requires authentication (e.g., initiating payment from the relying party's website, accessing private user account data, etc), the relying party 202 generates an authentication request which includes a random challenge (e.g., a cryptographic nonce). In one embodiment, the random challenge has a time limit associated with it (e.g., it is valid for a specified period of time). The relying party may also identify the authenticator to be used by the authentication client 201 for authentication. As mentioned above, the relying party may provision each authentication device available on the client and stores a public key for each provisioned authenticator. Thus, it may use the public key of an authenticator or may use an authenticator ID (e.g., AAID) to identify the authenticator to be used. Alternatively, it may provide the client with a list of authentication options from which the user may select.

In response to receipt of the authentication request, the user may be presented with a graphical user interface (GUI) requesting authentication (e.g., in the form of a web page or a GUI of an authentication application/app). The user then performs the authentication (e.g., swiping a finger on a fingerprint reader, etc). In response, the authentication client 201 generates an authentication response containing a signature over the random challenge with the private key associated with the authenticator. It may also include other relevant data such as the user ID code in the authentication response.

Upon receipt of the authentication response, the relying party may validate the signature over the random challenge (e.g., using the public key associated with the authenticator) and confirm the identity of the user. Once authentication is complete, the user is permitted to enter into secure transactions with the relying party, as illustrated.

A secure communication protocol such as Transport Layer Security (TLS) or Secure Sockets Layer (SSL) may be used to establish a secure connection between the relying party 201 and the authentication client 202 for any or all of the transactions illustrated in FIGS. 2-3.

System and Method for Implementing a Hosted Authentication Service

One embodiment of the invention includes a hosted authentication service which provides full authentication server functionality to multiple relying parties in parallel but which requires minimal integration efforts by relying party developers.

Typical authentication server implementations are deployed within relying party's network infrastructure. This is a common deployment option for large organizations whose policies do not allow critical security assets to be outside of their own infrastructure. However integrating authentication servers into an existing infrastructure is not a straightforward task and may require significant investment.

Some relying parties may prefer to forgo such investments and instead integrate with a hosted authentication service which provides the same authentication server capabilities while hiding the complexity of integration. However, sufficient security mechanisms must be in place for hosted authentication services to be accepted.

Figure 4:
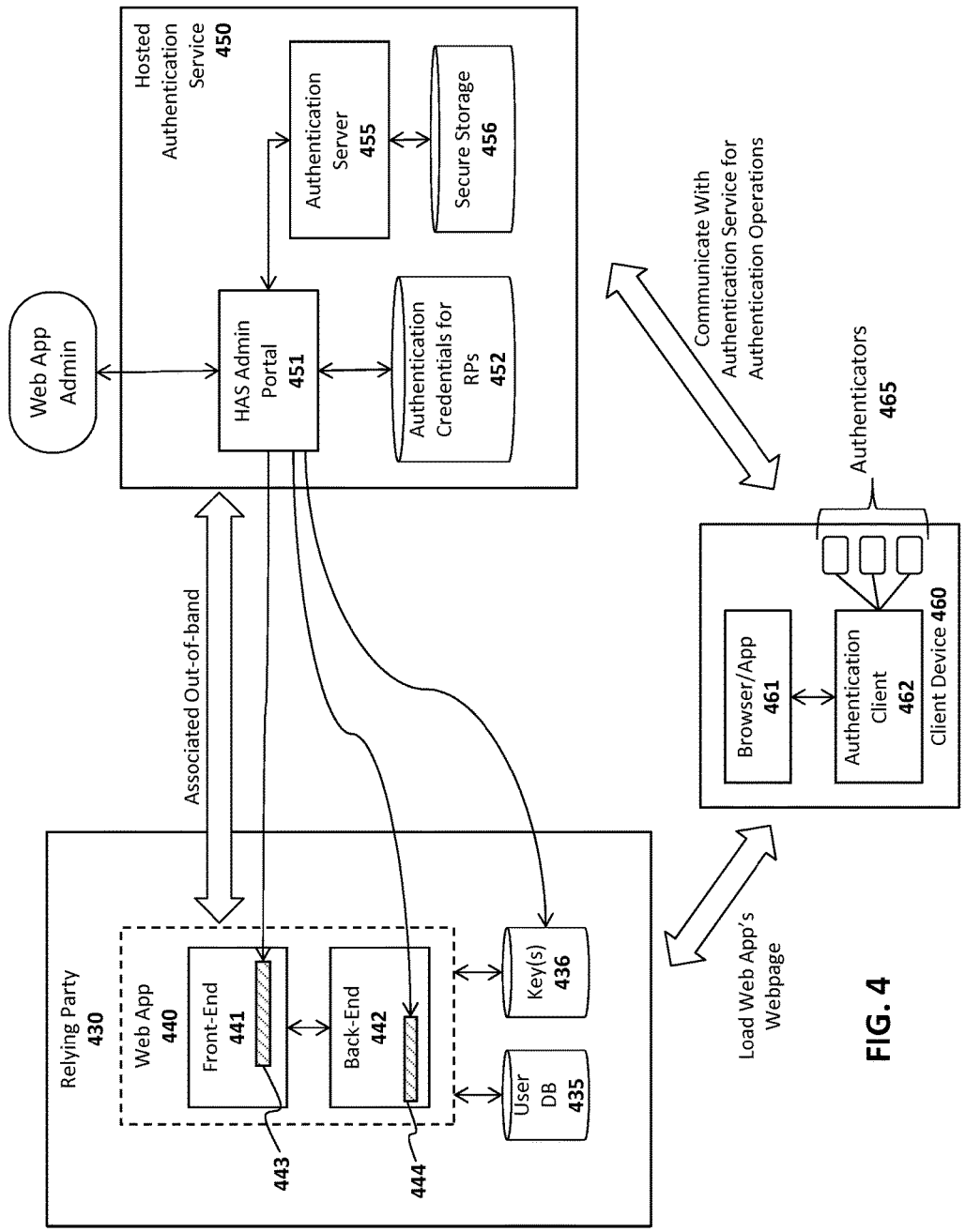
FIG. 4 illustrates one embodiment of a system for implementing a hosted authentication service.

As illustrated in FIG. 4, one embodiment of the invention includes a hosted authentication service (HAS) 450 implemented as an online system communicatively coupled to the relying party 430 over a network (e.g., the Internet) to provide the authentication capabilities mentioned above. As illustrated, the HAS-based architecture involves three components: a relying party (RP) web application 440; a hosted authentication service 450; and a client device 460 configured with authenticator(s) 465, an authentication client 462, and a browser or application 461.

In one embodiment, the RP web application 440 is a web-based online service such as a financial institution website, a social network website, a web-based email service, a web-based entertainment portal, etc. It has a database of users 435 who subscribe to the services offered by the web application 440 and a login system. The RP web application 440 is typically designed with a front-end component 441 and a back end component 442. The front-end component 441 may be a web server implemented with Hypertext Markup Language (HTML) code or other web-based code to dynamically generate web pages in response to user requests. The back-end component 442 typically has access to one or more databases 435 and includes the business logic for retrieving and/or generating the underlying data to be used in the web pages generated by the front-end component 441. For example, if the relying party is a financial institution, the back-end code 442 may access a database 435 containing account data in response to a user request. The back-end component 442 may then perform calculations using the account data and/or simply provide the account data to the front-end component 441 which will then include the account data or calculations performed using the account data in a web page. The manner in which the underlying data is presented to the user is typically defined by the front-end component 441.

In one embodiment, the hosted authentication service 450 is an online service which has authentication servers 455 deployed on behalf relying parties 430. As previously discussed, a client device 460 equipped with an authentication client 462 may register its authenticators 465 with the authentication server 455 (see, e.g., FIG. 2). Keys and other credentials associated with the authenticators 465 may then be stored in secure storage 456 by the authentication server 455 (and retrieved to authenticate the end user as illustrated in FIG. 3). In one embodiment, illustrated in FIG. 4, the hosted authentication service 450 also maintains a database 452 for storing registered authentication credentials (authentication registrations) for multiple RP web applications 440.

As mentioned, the client device 460 can be a laptop, tablet, phone, or any other data processing device with an authentication client 462 and access to an authenticator 465. The client device also includes a browser or application 461 to access the services offered by relying parties 430 (e.g., to access the relying parties website or other form of online service).

FIG. 4 illustrates one embodiment in which the RP web application 440 has an out-of-band association with a hosted authentication service (discussed below) and the RP web application's web page manages communication with the hosted authentication service 450. The hosted authentication architecture illustrated in FIG. 4 provides number of benefits for RP Web Application developers. In particular, users have the same user experience as with any other authentication-based web application. In addition, relying parties do not need to maintain authentication credentials in-house and only a small integration effort is required on the web application's 440's back-end 442 and front-end 441 (as discussed below).

In one embodiment, the integration process is initiated by registering a RP web application 440 with the hosted authentication service 450. A web application administrator (e.g., a member of the relying party's information technology staff) may be provided with access via a hosted authentication service administration portal 451 and may create an account by providing the necessary details (e.g., information related to the web application 440 as discussed below). In one embodiment, the relying party administrator is provided with authentication credentials (e.g., a secret code such as a PIN or password) to access the administration portal 451 ahead of time. The administrator may then log into the administration portal 451 using the credentials. In one embodiment, the administration portal 451 is a web-based portal accessible via the administrator's browser. However, the underlying principles of the invention are not limited to any particular manner of accessing the administrative portal 451.

The web application administrator may provide the administrative portal 451 with the necessary login credentials and other pertinent information such as the network address(es) needed to access the web application's front-end program code and back-end program code. In one embodiment, in response to a request from the web application administrator to register the web application 440 with the hosted authentication service 450, the administration portal 451 generates HTML code 443 which is incorporated into web application's 440's front-end 441 (e.g., the web app's webpage). The HTML code 443 may be implemented in pure Javascript, HTML iframe or using any other programming language compatible with the web application 440. In one embodiment, the HTML code will directly communicate with the web application 440 program code (e.g., the front-end code 441).

In one embodiment, the hosted authentication service portal 451 also generates back-end code 444 which is incorporated into the web application's back-end 442. Both the HTML code 443 and back-end code 444 generated by the administration portal 451 are shown being applied to an active instance of the web application 440 in FIG. 4. However, in one embodiment, the installation of the new code 443-444 may be performed prior to execution of the web application (e.g., applied to the application binaries and libraries stored on a mass storage device).

In one embodiment, the hosted authentication service portal 451 also generates a cryptographic key (e.g., a symmetric key or a certificate), referred to herein as the hosted authentication service "assertion key" which is then stored in secure storage 436 in the web application's backend infrastructure. In one embodiment, the key 436 is then used by the back-end 442 to validate hosted authentication service 450 assertions (as discussed below). After integrating the hosted authentication service code 443-444 into the web application and providing the key(s) 436, the integration is complete.

Once the integration process has been completed, the web application users can start using client-side authenticators 465 to authenticate with the relying party 430. In one embodiment, the HTML code 443 provided by hosted authentication service 450 will manage the user authentication experience including authentication-related communication. It one embodiment, once downloaded into the user's browser 461, the HTML code 443 will directly communicate with the authentication client 462 to direct the authentication client 462 to the authentication server 455 on the hosted authentication service 450. In one embodiment, the HTML code 443 communicates with a plugin (e.g., the secure transaction plugin 101 shown in FIG. 1A), which is installed on the client device's browser 461 to enable secure communication with the hosted authentication service 450 and authentication client 462.

In one embodiment, the authentication server 455 on the hosted authentication service 450 will then generate authentication requests and exchange other authentication-related messages with the authentication client (see, e.g., FIGS. 2-3 and associated text). When the authentication-related operations are completed (e.g., registration, user authentication, deregistration, etc) the hosted authentication service 450 will notify the web application 440 via cryptographic assertions using the hosted authentication service assertion key 436. For example, the authentication server 455 may use the assertion key 436 to generate a signature over each assertion sent to the web application 440. The back-end code 444 running in the web application 440 may then verify the assertions by using its own copy of the key 436 to validate the signature. Similarly, the back end code 444 may generate a signature using the key 436 over any communication sent from the web application 440 to the hosted authentication service 450, which may validate the communication using its copy of the key.

In one embodiment, the assertions sent from the hosted authentication service 450 may include any information related to the provisioning/registration of authenticators 465 and authentications performed via the authenticators 465. For example, the assertions may notify the web application 440 about activities such as the registration of authentication devices and pertinent information related to the authentication devices such as security strength (e.g., User X has just registered an authenticator with a security strength of Y); successful authentications by the user using a particular authenticator or authenticator type (e.g., User X has just authenticated with an authenticator with a security strength Y); and the deregistration of authenticators (e.g., User X has just deregistered an authenticator Y).

The assertions may be implemented using Security Assertion Markup Language (SAML), OAuth, Open ID or any other similar technology. In some hosted authentication service architectures the assertions may go from hosted authentication service servers 455 directly to the web application 440 servers (e.g., bypassing the client device 460). In an alternate implementation, the assertions may be sent through the client device 460 (e.g., as Javascript sent to the browser 461, which then forwards the assertions on to the web application 440).

Figure 5:
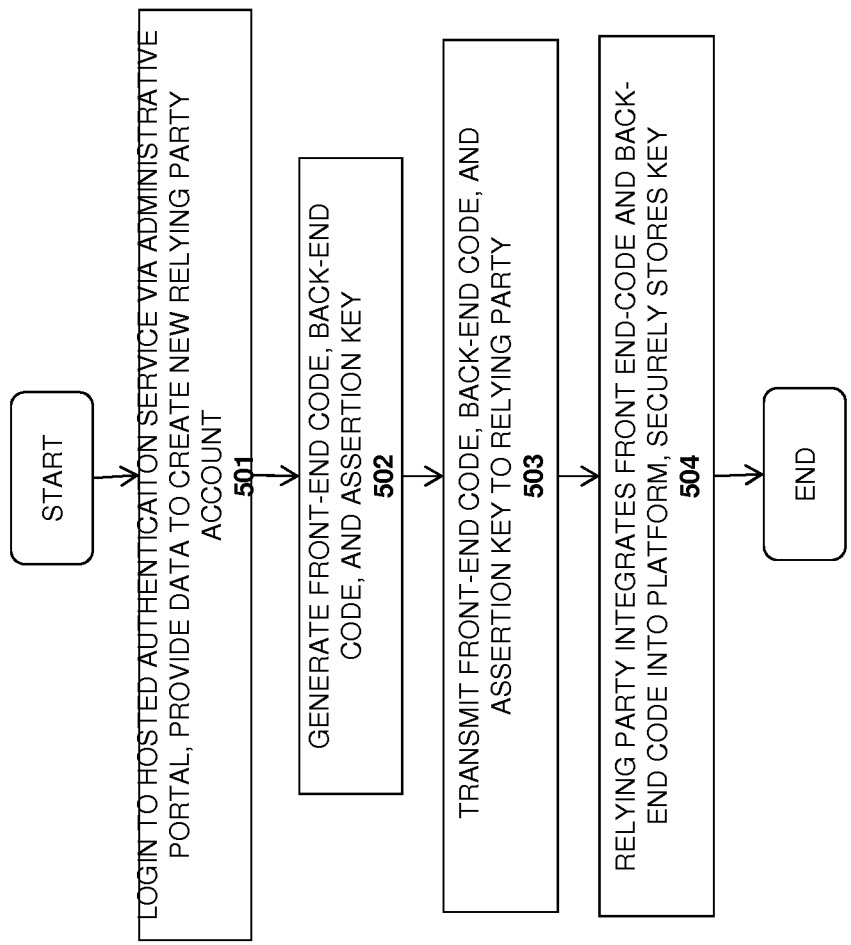
FIG. 5 illustrates one embodiment of a method for registering a relying party with a hosted authentication service.
Figure 6:
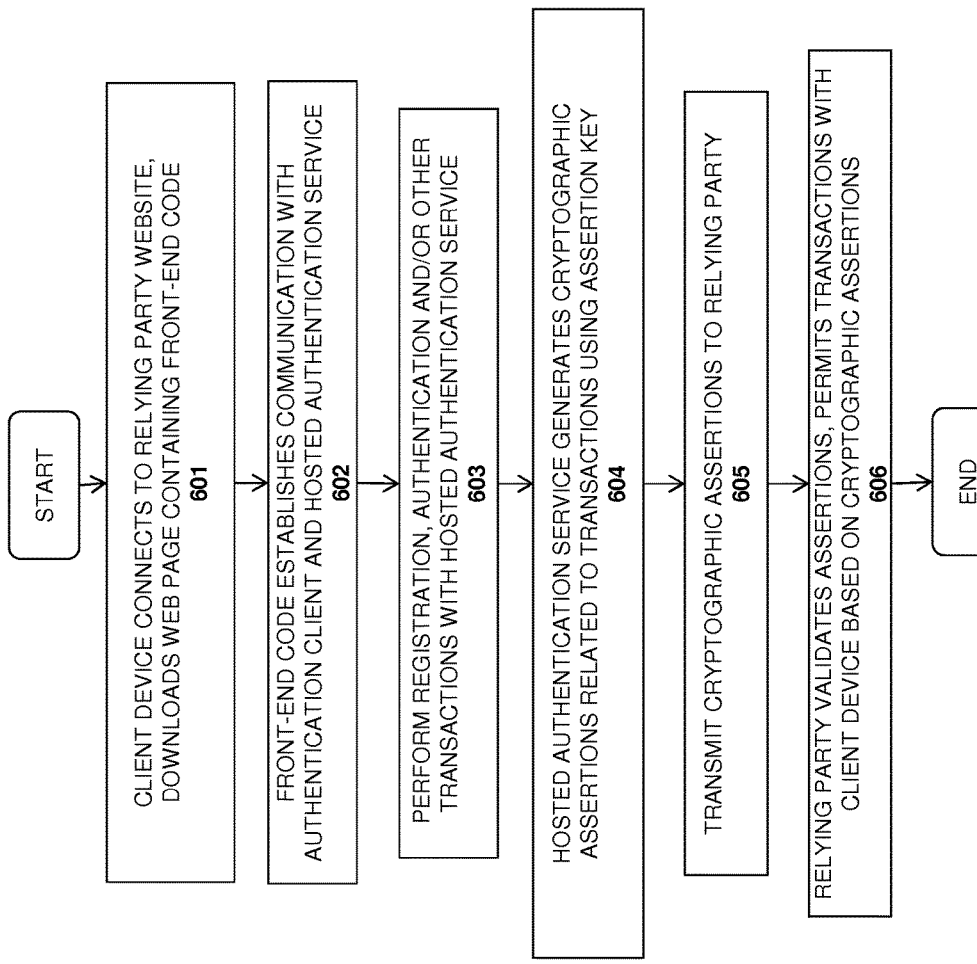
FIG. 6 illustrates one embodiment of a method for using a hosted authentication service.

FIG. 5 illustrates a method for registering a relying party with a hosted authentication service in accordance with one embodiment of the invention and FIG. 6 illustrates a method for performing operations such as registration and deregistration of authentication devices and user authentication with a hosted authentication service. The methods may be implemented within the context of the architecture shown in FIG. 4, but are not limited to any particular system architecture.

At 501, the relying party administrator logs in to an administrative portal of the hosted authentication service (e.g., using provided credentials) and provides the data needed to create a new relying party account. This may include networking data needed to identify the relying party web application(s) over the network and potentially authentication credentials (e.g., user name/password) to access the web applications (particularly, the web application's front-end program code and back-end program code).

At 502, in response to a request from the web application administrator to register a web application with the hosted authentication service, the administration portal generates front-end code (e.g., HTML code) which is incorporated into web application's front-end (e.g., the web app's webpage) and back-end code which is incorporated into the web application's back-end. In addition, at 502, the hosted authentication service portal generates a cryptographic assertion key (e.g., a symmetric key or a certificate).

At 503, the front-end code, back-end code, and assertion key are transmitted to the relying party. At 504, the relying party integrates the front-end code and back-end code into its platform and securely stores the assertion key. As mentioned, in one embodiment, the assertion key is subsequently used to validate hosted authentication service assertions.

Turning now to FIG. 6, at 601 a client device equipped with one or more authentication devices connects to the relying party's website and downloads a web page containing the front-end code. In some instances the webpage may contain code which is dynamically generated by the front-end code (rather than the front-end code itself). As used herein, the "front-end code" refers to both the front-end code itself and code which is dynamically generated by the front-end code for use on the client device.

At 602, the front-end code establishes communication with the authentication client on the client device and the hosted authentication service (or, more precisely, an authentication server at the hosted authentication service). At 603, one or more transactions are performed such as registering a new authenticator, performing user authentication, and/or deregistering an authenticator.

At 604, the hosted authentication service generates cryptographic assertions related to the transactions using the assertion key. For example, a cryptographic assertion may indicate new registered authenticators, deregistered authenticators, information related to the authenticators such as the accuracy/precision of the authenticators (e.g., the authenticator strength), and user authentications with the authenticators. As mentioned, the cryptographic assertions may be signed with the assertion key.

At 605, the cryptographic assertions are transmitted to the relying part and, at 606, validates the assertions using the assertion key. For example, the back-end code may retrieve the assertion key, generate its own signature and compare the generated signature to the signature sent from the hosted authentication service. If the signatures match, then the assertion is validated and the user may be permitted to perform a transaction based on the assertion. For example, if the assertion indicates that the user has successfully authenticated with the hosted authentication service, the relying party may accept the authentication and permit the user to complete a transaction (e.g., a financial transaction, access to private data, etc).

In one embodiment, the hosted authentication service may be implemented using a variety of different protocols/languages including, for example, Security Assertion Markup Language (SAML), JavaScript Objection Notation (JSON) Web Signatures, OAuth, or similar technology to convey the hosted authentication service assertions to the relying party. Moreover, the hosted authentication service system may use iframes for the front-end and back-end code embedded into the relying party's webpage (e.g., which communicates to the relying party's website about hosted authentication service assertions). It should be noted, however, that the underlying principles of the invention are not limited to any particular protocol and/or programming language.

The embodiments of the invention described herein are preferable to existing federation identity servers and identity providers because an end user's privacy is better protected. While the relying party may itself have information related to the user, this information need not be shared with the authentication hosting service (or any other relying parties) to implement the hosted authentication techniques described herein. This is in contrast to existing identity providers and federation servers which allow relying parties to track users across different relying parties.

Exemplary Data Processing Devices

Figure 7:
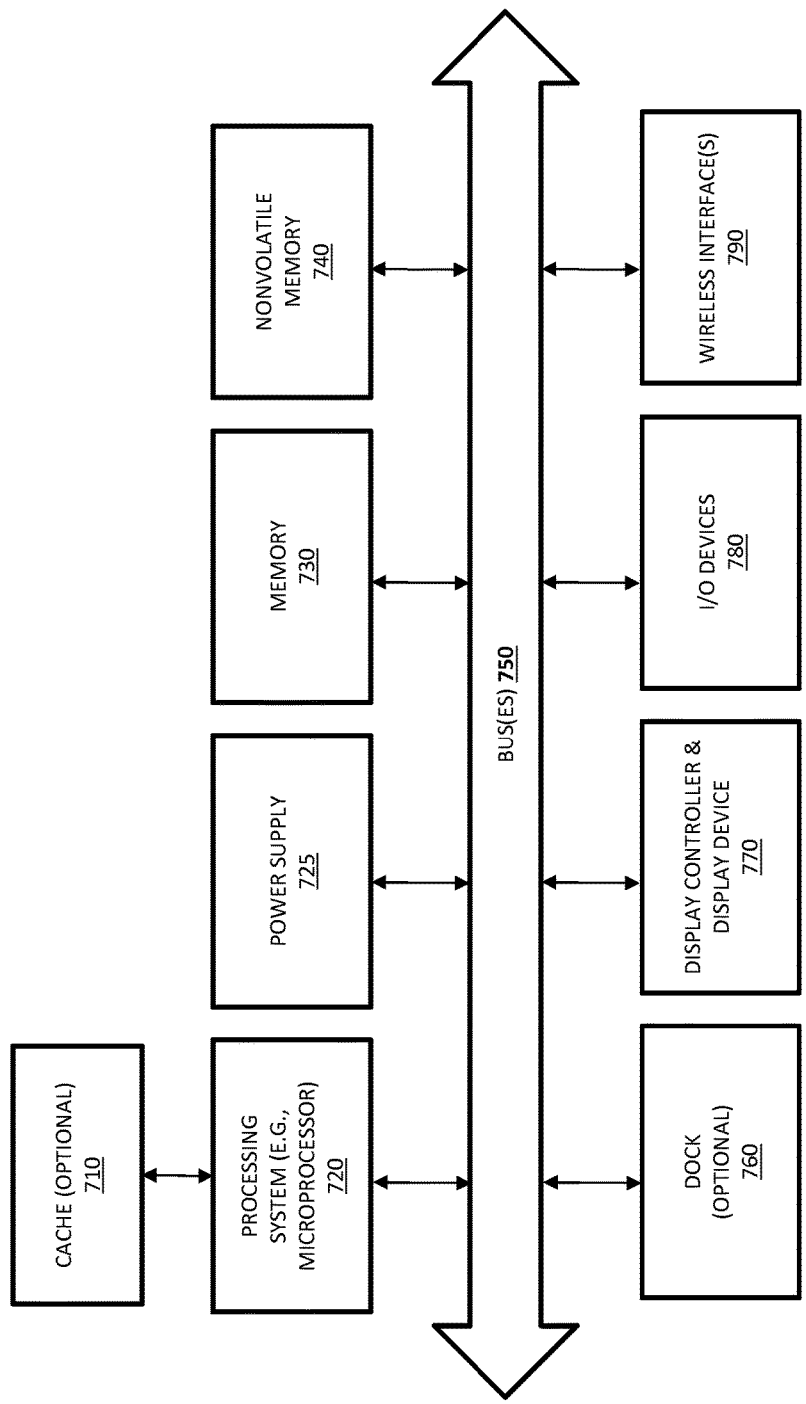
FIG. 7 illustrates one embodiment of a computer architecture used for servers and/or clients.

FIG. 7 is a block diagram illustrating an exemplary clients and servers which may be used in some embodiments of the invention. It should be understood that while FIG. 7 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations as described above. The bus 750 interconnects the above components together and also interconnects those components to the optional dock 760, the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.).

Figure 8:
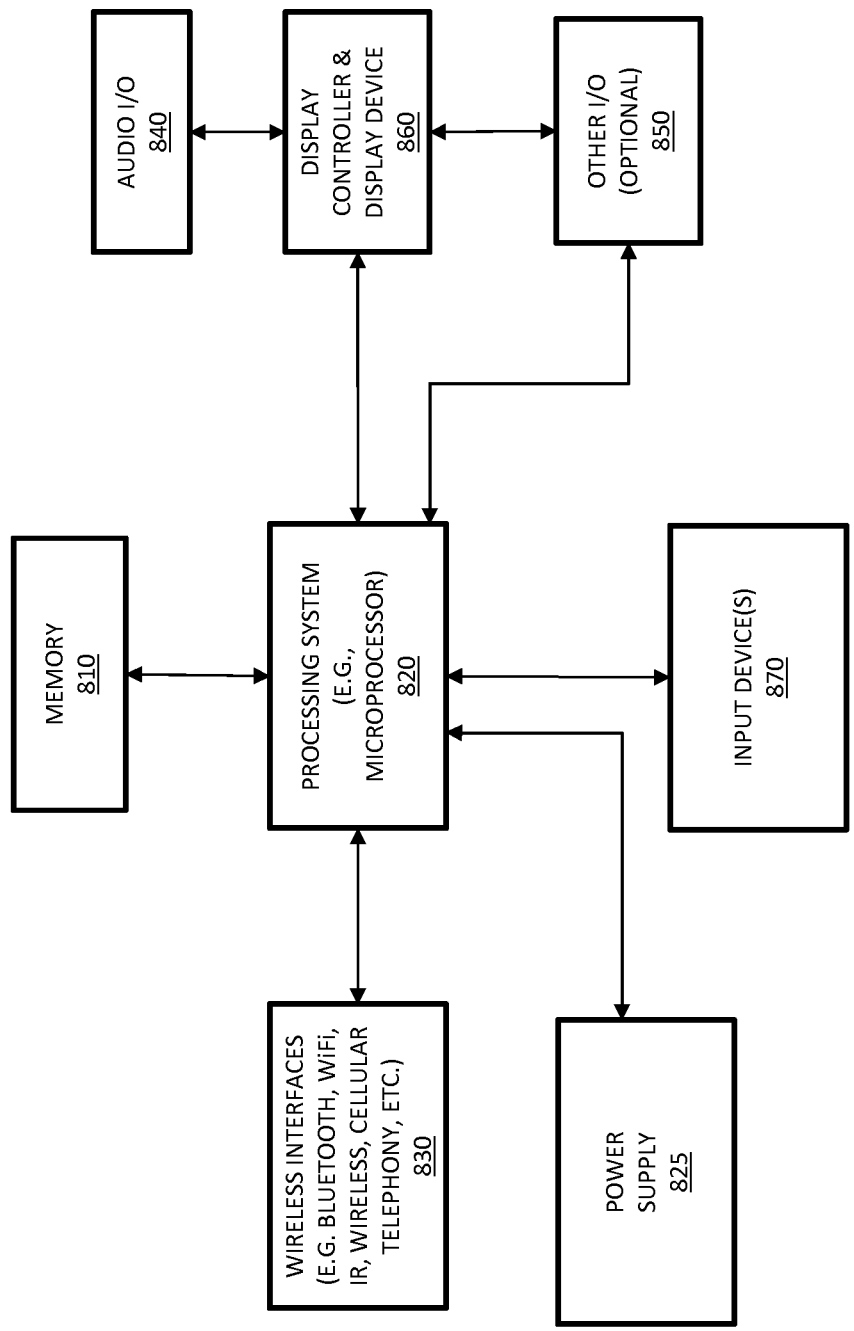
FIG. 8 illustrates one embodiment of a computer architecture used for servers and/or clients.

FIG. 8 is a block diagram illustrating an exemplary data processing system which may be used in some embodiments of the invention. For example, the data processing system 800 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 800 may be a network computer or an embedded processing device within another device.

According to one embodiment of the invention, the exemplary architecture of the data processing system 800 may be used for the mobile devices described above. The data processing system 800 includes the processing system 820, which may include one or more microprocessors and/or a system on an integrated circuit. The processing system 820 is coupled with a memory 810, a power supply 825 (which includes one or more batteries) an audio input/output 840, a display controller and display device 860, optional input/output 850, input device(s) 870, and wireless transceiver(s) 830. It will be appreciated that additional components, not shown in FIG. 8, may also be a part of the data processing system 800 in certain embodiments of the invention, and in certain embodiments of the invention fewer components than shown in FIG. 8 may be used. In addition, it will be appreciated that one or more buses, not shown in FIG. 8, may be used to interconnect the various components as is well known in the art.

The memory 810 may store data and/or programs for execution by the data processing system 800. The audio input/output 840 may include a microphone and/or a speaker to, for example, play music and/or provide telephony functionality through the speaker and microphone. The display controller and display device 860 may include a graphical user interface (GUI). The wireless (e.g., RF) transceivers 830 (e.g., a WiFi transceiver, an infrared transceiver, a Bluetooth transceiver, a wireless cellular telephony transceiver, etc.) may be used to communicate with other data processing systems. The one or more input devices 870 allow a user to provide input to the system. These input devices may be a keypad, keyboard, touch panel, multi touch panel, etc. The optional other input/output 850 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A system comprising: one or more hardware platforms implementing a hosted authentication service to provide authentication services for relying parties, the hosted authentication service and the relying parties being separate parties, the hosted authentication service registering a relying party by sharing a key with the relying party, the hosted authentication service comprising an administration portal through which a relying party administrator configures the hosted authentication service to provide authentication services on behalf of the relying party;
   a first program code component provided by the hosted authentication service is inserted into an application hosted by the relying party, the first program code component causing a client device accessing the application to be redirected to the hosted authentication service for user-authentication and other authentication-related functions including registering one or more new authenticators and deregistering one or more authenticators of a user's client device; and
   the hosted authentication service, based on a plurality of different authentication-related events occurring between the client device and the hosted authentication service, transmitting a plurality of assertions directly to the relying party thereby bypassing the client device, each assertion of the plurality of assertions specifying one different authentication-related event occurring between the client device and the hosted authentication service, each assertion of the plurality of assertions including at least one indication, wherein a first assertion indicates that the user has registered a new authenticator, a second assertion indicates that the user has deregistered an authenticator, and a third assertion indicates that the user has authenticated with the authentication service using an authenticator, wherein the relying party validating each one of the plurality of assertions using the key.

2. The system as in claim 1 wherein the key comprises a symmetric assertion key.

3. The system as in claim 2 wherein the hosted authentication service generates a first signature over data in one of the plurality of assertions using the symmetric assertion key, the relying party using its copy of the symmetric assertion key to generate a second signature over the data in the one of the plurality of assertions and comparing the first signature with the second signature to validate the one of the plurality of assertions.

4. The system as in claim 1 wherein the first program code component comprises hypertext markup language (HTML) code and wherein the application comprises a Web application.

5. The system as in claim 1 further comprising: a second program code component inserted into a back-end component of the application hosted by the relying party, the second program code component securely storing the key.

6. The system as in claim 5 wherein the application comprises a Web application including the back-end and a front-end comprising hypertext markup language (HTML) code.

7. The system as in claim 1 wherein the administration portal generates front-end code to be applied to a front-end of the application and back-end code to be applied to a back-end of the application, the front-end code usable to redirect client devices to the hosted authentication service and the back-end code usable to securely store and access the key.

8. The system as in claim 1 wherein each one of the plurality of assertions further includes an indication of an authenticator type, model, and/or strength.

9. A method comprising: registering a relying party at a hosted authentication service by sharing a key with the relying party, the hosted authentication service and the relying parties being separate parties, the hosted authentication service comprising an administration portal through which a relying party administrator configures the hosted authentication service to provide authentication services on behalf of the relying party;
   inserting a first program code component provided by the hosted authentication device into an application hosted by the relying party, the first program code component causing a client device accessing the application to be redirected to the hosted authentication service for user-authentication and other authentication-related functions including registering one or more new authenticators and deregistering one or more authenticators of a user's client device; and
   transmitting, based on a plurality of authentication-related events occurring between the client device and the hosted authentication service, a plurality of assertions from the hosted authentication service directly to the relying party thereby bypassing the client device, each assertion of the plurality of assertions specifying one different authentication-related event occurring between the client device and the hosted authentication service, each assertion of the plurality of assertions including at least one indication, wherein a first assertion indicates that the user has registered a new authenticator, a second assertion indicates that the user has deregistered an authenticator, and a third assertion indicates that the user has authenticated with the authentication service using an authenticator, wherein the relying party validating each one of the plurality of assertions using the key.

10. The method as in claim 9 wherein the key comprises a symmetric assertion key.

11. The method as in claim 10 wherein the hosted authentication service generates a first signature over data in one of the plurality of assertions using the symmetric assertion key, the relying party using its copy of the symmetric assertion key to generate a second signature over the data in the one of the plurality of assertions and comparing the first signature with the second signature to validate the one of the plurality of assertions.

12. The method as in claim 9 wherein the first program code component comprises hypertext markup language (HTML) code and wherein the application comprises a Web application.

13. The method as in claim 9 further comprising: a second program code component inserted into a back-end component of the application hosted by the relying party, the second program code component securely storing the key.

14. The method as in claim 13 wherein the application comprises a Web application including the back-end and a front-end comprising hypertext markup language (HTML) code.

15. The method as in claim 9 wherein the administration portal generates front-end code to be applied to a front-end of the application and back-end code to be applied to a back-end of the application, the front-end code usable to redirect client devices to the hosted authentication service and the back-end code usable to securely store and access the key.

16. The method as in claim 9 wherein each one of the plurality of assertions further includes an indication of an authenticator type, model, and/or strength.

17. A non-transitory machine-readable medium having program code stored thereon which, when executed by a machine, causes the machine to perform operations of: registering a relying party at a hosted authentication service by sharing a key with the relying party, the hosted authentication service and the relying parties being separate parties, the hosted authentication service comprising an administration portal through which a relying party administrator configures the hosted authentication service to provide authentication services on behalf of the relying party;
inserting a first program code component provided by the hosted authentication service into an application hosted by the relying party, the first program code component causing a client device accessing the application to be redirected to the hosted authentication service for user-authentication and other authentication-related functions including registering one or more new authenticators and deregistering one or more authenticators of a user's client device; and
transmitting, based on a plurality of different authentication-related-events occurring between the client device and the hosted authentication service, a plurality of assertions from the hosted authentication service directly to the relying party thereby bypassing the client device, each assertion of the plurality of assertions specifying one different authentication-related event occurring between the client device and the hosted authentication service, each assertion of the plurality of assertions including at least one indication, wherein a first assertion indicates that the user has registered a new authenticator, a second assertion indicates that the user has deregistered an authenticator, and a third assertion indicates that the user has authenticated with the authentication service using an authenticator, wherein the relying party validating each one of the plurality of assertions using the key.

18. The non-transitory machine-readable medium as in claim 17 wherein the key comprises a symmetric assertion key.

19. The non-transitory machine-readable medium as in claim 18 wherein the hosted authentication service generates a first signature over data in one of the plurality of assertions using the symmetric assertion key, the relying party using its copy of the symmetric assertion key to generate a second signature over the data in the one of the plurality of assertions and comparing the first signature with the second signature to validate the one of the plurality of assertions.

20. The non-transitory machine-readable medium as in claim 17 wherein the first program code component comprises hypertext markup language (HTML) code and wherein the application comprises a Web application.

* * * * *